No. 777,755. PATENTED DEC. 20, 1904.
B. T. SEELYE.
VOTING MACHINE.
APPLICATION FILED MAR. 31, 1904.
NO MODEL. 2 SHEETS—SHEET 1.

Witnesses.
Emma Sharp
Julia Tarrent

Inventor.
Byron T. Seelye.
By Atty N. DuBois.

No. 777,755. PATENTED DEC. 20, 1904.
B. T. SEELYE.
VOTING MACHINE.
APPLICATION FILED MAR. 31, 1904.
NO MODEL. 2 SHEETS—SHEET 2.

Witnesses.
Emma Sharp
Julia Tarrent

Inventor.
Byron T. Seelye.
By Atty N. DuBois

No. 777,755.

Patented December 20, 1904.

UNITED STATES PATENT OFFICE.

BYRON T. SEELYE, OF CHICAGO, ILLINOIS.

VOTING-MACHINE.

SPECIFICATION forming part of Letters Patent No. 777,755, dated December 20, 1904.

Application filed March 31, 1904. Serial No. 201,004.

*To all whom it may concern:*

Be it known that I, BYRON T. SEELYE, a citizen of the United States, residing at 333½ Flournoy street, in the city of Chicago, county of Cook, and State of Illinois, have invented certain new and useful Improvements in Voting-Machines, of which the following is such a full, clear, and exact description as will enable others skilled in the art to which it appertains to make and use my said invention.

My invention relates to voting-machines, and is particularly applicable to machines of the type shown and described in United States Patent No. 667,807 for a voting-machine, granted to William A. Swaren February 12, 1901.

The purposes of my invention are to provide a chamber-plate having a series of reserve chambers each adapted to contain a number of balls, said chambers being so disposed on said plate as to be respectively registrable with suitable apertures in a dropping plate in operative relation to perforated slides controlling the deposit of the balls into underlying ball-boxes, and to provide means of improved construction for agitating the balls contained in a hopper above said chamber-plate, so as to cause the filling of the chambers in said chamber-plate.

With these purposes in view my invention consists of the novel features of construction and combinations of parts shown in the annexed drawings, to which reference is hereby made, and hereinafter particularly described, and finally recited in the claims.

Figure 1:
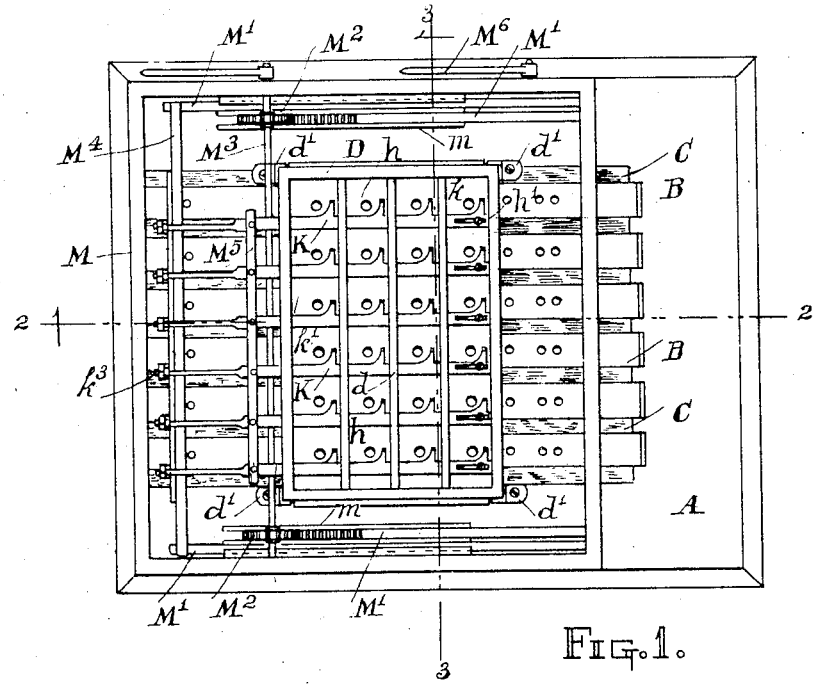
Figure 2:
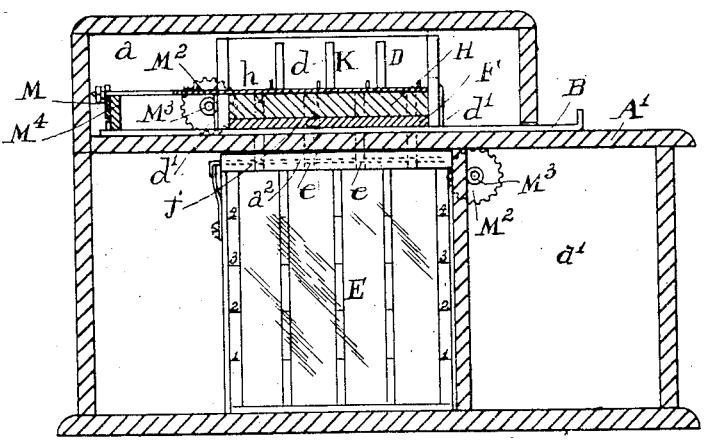
Figure 3:
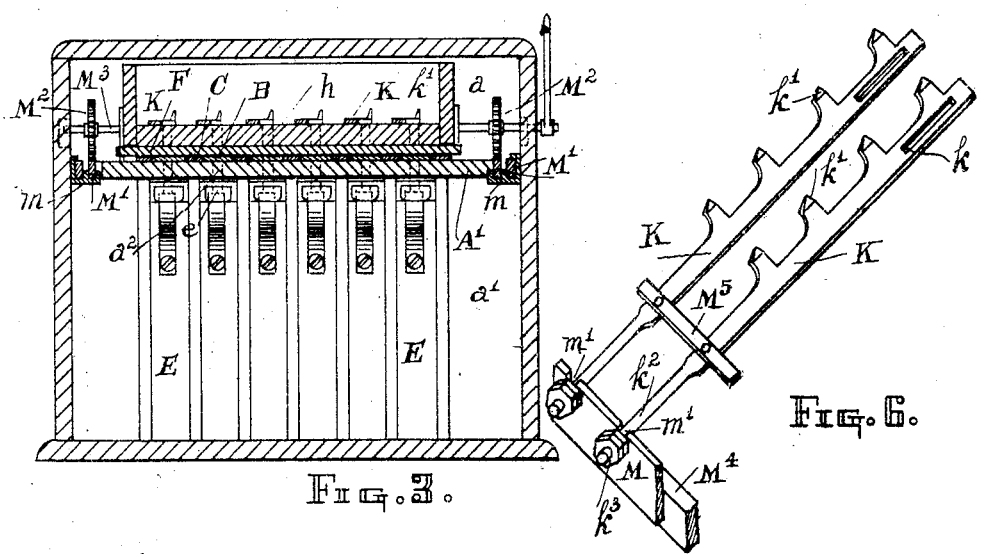
Figure 6:
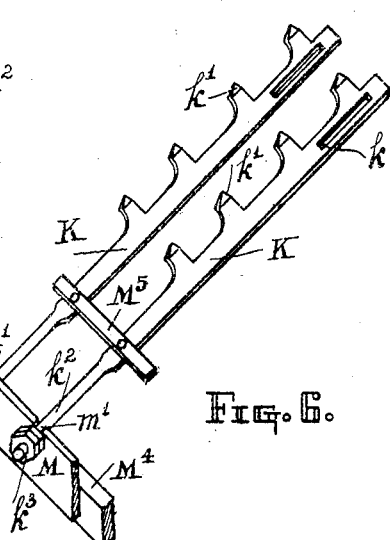
Figure 4:
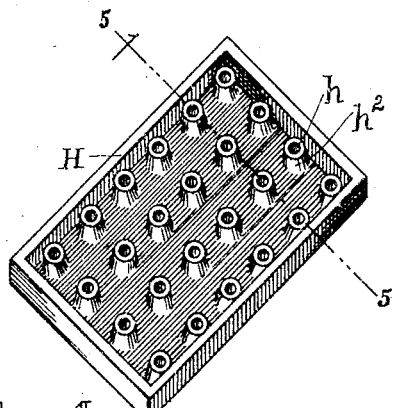
Figure 5:

Referring to the drawings, Figure 1 is a top plan of a voting-machine embodying my improvements. Fig. 2 is a vertical longitudinal section on the line 2 2 of Fig. 1. Fig. 3 is a vertical transverse section on line 3 3 of Fig. 1. Fig. 4 is an enlarged perspective view of the under side of the chamber-plate. Fig. 5 is a vertical transverse section on the line 5 5 of Fig. 4, and Fig. 6 is an enlarged perspective view of two of the agitators detached.

Similar reference-letters designate like parts in all of the views.

The devices herein shown and described are modifications and improvements of the apparatus set forth in United States Patents Nos. 667,806 and 667,807, granted to W. A. Swaren, February 12, 1901, and are designed to render more effective and reliable the dropping mechanism set forth in said patents.

The main structure of the voting-machine consists of a suitable cabinet A, having a horizontal partition A' separating an upper compartment $a$ from a lower compartment $a'$. Perforated slides B slide between guides C, secured on the upper surface of the partition A'. A hopper D, having partitions $d$, is supported within the cabinet by suitable standards $d'$, secured on the part A'. The lower edge of the hopper lies somewhat above the upper surface of the slides and guides, so that the slides may move freely under the hopper. The part A' is perforated by a number of series of holes $a^2$, overlying and registering exactly with openings $e$ in ball-boxes E, respectively, underlying the slides B. The partitions $d$ divide the hopper into a series of compartments each containing a supply of balls. A cut-off plate F, of suitable material, in thickness slightly exceeding the diameter of one ball, is situated and is freely slidable transversely between the dropping slides and the dropping plate and is pierced by a number of series of holes $f$, which correspond in number to and are registrable with the perforations $a^2$ in the plate A'. The holes $f$ are each adapted to contain only one ball at one time.

The chamber-plate H forms the bottom of the hopper and has a number of series of chambers $h$, each adapted to contain two or more balls. The chambers $h$ being adapted each to contain a multiplicity of balls, certainty in filling the holes in the cut-off plate is assured, because there will always be in each chamber one or more balls in position to fall into the corresponding hole in the cut-off plate whenever the hole in the cut-off plate is brought in registry with the chamber in the chamber-plate. In order that the chambers may have the proper depth without unduly increasing the weight of the plate, the chambers have annular walls $h^2$, each projecting downwardly from the under side of the plate, as shown. The chambers $h$ are respectively in registry with the perforations $a^2$ through the partitional plate A'.

In order to assure proper and constant filling of the chambers $h$, I provide stirrers K. The stirrers K are of metal and have longitudinal slots $k$, which accommodate screws $h'$ or equivalent device connecting the stirrers with the plate H, so that the stirrers may slide freely on top of the plate. Each of the stirrers also has a series of laterally-projecting and upturned fingers $k'$, corresponding in number and position to the chambers $h$ in the plate H. Each of the stirrers also has a screw-threaded shank $k^2$ and nuts $k^3$, fitting on the shank on each side of the stirrer-bar, so as to adjustably connect the stirrers K with the stirrer-bar M. The stirrer-bar M is secured on one side of and extends upwardly above the cross-piece $M^4$ and has a series of notches $m'$, corresponding in number with the number of stirrers, the shanks of the stirrers being slidable in the notches $m'$. The shanks of the stirrers are connected with each other by a connecting-bar $M^5$.

There are several important practical advantages in the described construction of the stirrers—viz., the stirrers being in the same horizontal plane with the stirrer-bar M the shanks of the stirrers pass horizontally through the bar, and by turning the nuts $k^3$ the stirrers may be adjusted longitudinally to bring the fingers $k'$ in proper relation to the chambers $h$ in the plate H.

It will be observed that the stirrer-bar M has a directly-horizontal push and pull on the stirrers. The stirrer may therefore be made of thin metal and yet have such rigidity that the stirrer will not spring out of position or become displaced in use. The stirrers being made of thin metal, as described, the horizontal members of the fingers $k'$ are adapted to freely slide under the balls in the hopper, and the thin edges of the fingers cannot engage with the balls, so as to cause locking of the stirrers. The vertical members of the stirrers separate and agitate the balls, so as to cause them to roll into the chambers $h$. The screws $h'$ guide and prevent lifting of the stirrers.

Rack-bars M' are slidable in suitable supports $m$ on the sides of the cabinet and are operated by cog-wheels $M^2$, secured on the revoluble shaft $M^3$. The cross-bar $M^4$ connects the rear ends of the outer pair of rack-bars M', and the stirrers K are connected with the cross-bar, as hereinbefore described. When the lower shaft $M^3$ is turned forwardly, the bar M travels forwardly. During the first part of this forward movement the notches $m'$ of the bar M slide under the shanks $k^2$ of the stirrer K. During the latter part of this forward movement the bar M engages with the enlarged parts at the base of the shanks $k^2$ and slides all of the stirrers simultaneously forward. When the lower shaft $M^3$ is turned forward, the bar M moves rearwardly and in doing so engages the nuts $k^3$ on the shanks $k^2$ to simultaneously move all of the stirrers K rearwardly. It will be seen then that each reciprocation of the rack-bar causes a corresponding movement of the stirrers, and the stirrers agitate the balls and cause a constant and uniform filling of the chambers $h$ in the plate H.

I am aware that the stirrers have been used to stir the balls in the hoppers of voting-machines. I therefore do not claim that feature broadly, but restrict my claim to the novel features of construction herein set forth.

Having fully described my invention, what I claim as new, and desire to secure by Letters Patent, is—

1. A stirrer for voting-machines, having a shank, nuts fitting on said shank, and laterally-projecting upturned fingers; in combination with a chamber-plate in operative relation to ball-receptacles, connecting devices connecting said stirrer with said chamber-plate, a stirrer-bar with which said stirrers are connected, and means for reciprocating said stirrer-bar, as set forth.

2. A chamber-plate for voting-machines, having a number of chambers surrounded by annular walls projecting downwardly from said plate, each chamber being adapted to contain a multiplicity of balls; in combination with ball-receptacles, dropping slides, a reciprocable cut-off plate, and reciprocable stirrers having laterally-projecting fingers in operative relation to the chambers inside the chamber-plate, as set forth.

3. In a voting-machine, the combination of a cabinet, ball-receptacles in said cabinet, rack-bars mounted to slide in said cabinet, means for sliding said rack-bars, a stirrer-bar connecting said rack-bars, stirrers mounted and adjustable on said stirrer-bar, a stationary chamber-plate having a number of series of chambers each adapted to contain a multiplicity of balls, dropping slides having perforations registrable with the openings in said ball-receptacles, and a reciprocable cut-off plate between said chamber and said slides and having perforations corresponding to and registrable with the chambers in said chamber-plate, as set forth.

In witness whereof I have hereunto subscribed my name, at Bloomington, Illinois, this 23d day of March, 1904.

BYRON T. SEELYE.

Witnesses:
F. M. FOLLICK,
JOE MEANS.